(12) United States Patent
Warecki et al.

(10) Patent No.: US 8,336,700 B2
(45) Date of Patent: Dec. 25, 2012

(54) TRANSPORT SYSTEM FOR MOVING A PLURALITY OF CONTAINERS THROUGH A PLURALITY OF WORK STATIONS

(75) Inventors: Mark Joseph Warecki, Millville, MA (US); Guido Marchesi, Lido di Spina (IT); Charles J. Selig, Wendell, MA (US)

(73) Assignee: Ima North America, Inc., Leominster, MA (US)

( * ) Notice: Subject to any disclaimer, the term of this patent is extended or adjusted under 35 U.S.C. 154(b) by 412 days.

(21) Appl. No.: 12/420,569

(22) Filed: Apr. 8, 2009

(65) Prior Publication Data

US 2010/0258404 A1    Oct. 14, 2010

(51) Int. Cl.
*B65G 37/00* (2006.01)
*B65G 47/00* (2006.01)
*B65G 43/10* (2006.01)

(52) U.S. Cl. ............... 198/339.1; 198/738; 198/743
(58) Field of Classification Search .................. None
See application file for complete search history.

(56) References Cited

U.S. PATENT DOCUMENTS

| | | | |
|---|---|---|---|
| 4,768,642 A | 9/1988 | Hunter | |
| 4,931,122 A * | 6/1990 | Mitchell | 156/215 |
| 4,991,708 A | 2/1991 | Francioni | |
| 5,208,762 A | 5/1993 | Charhut et al. | |
| 5,337,887 A | 8/1994 | Greenwell et al. | |
| 5,522,512 A | 6/1996 | Archer et al. | |
| 5,884,749 A | 3/1999 | Goodman | |
| 6,141,943 A * | 11/2000 | Hart et al. | 53/444 |
| 6,343,628 B2 * | 2/2002 | Reinecke | 141/165 |
| 6,363,687 B1 | 4/2002 | Luciano et al. | |
| 6,522,945 B2 | 2/2003 | Sleep et al. | |
| 7,401,446 B2 | 7/2008 | Perazzo et al. | |
| 2004/0123567 A1 | 7/2004 | McErlean et al. | |
| 2007/0000570 A1 | 1/2007 | Lechner et al. | |
| 2007/0095018 A1 | 5/2007 | Perazzo et al. | |
| 2008/0060322 A1 | 3/2008 | Schateikis et al. | |
| 2008/0141622 A1 | 6/2008 | Bechini | |

OTHER PUBLICATIONS

International Search Resport and Written Opinion for priority application PCT/US2009/047743. US Patent references submitted on IDS dated Aug. 31, 2009.

* cited by examiner

*Primary Examiner* — Kavel Singh
(74) *Attorney, Agent, or Firm* — Husch Blackwell LLP; Samuel Digirolamo

(57) ABSTRACT

An apparatus for transporting a plurality of containers through a plurality of work stations including at least two conveyor assemblies, each conveyor assembly being adapted to sequentially convey at least one group of containers therealong in a row from one work station to another. The apparatus further includes a plurality of holder assemblies for holding the containers, some of the holder assemblies being associated with one of the conveyor assemblies and some of the holder assemblies being associated with the other conveyor assembly. The holder assemblies are located on the respective conveyor assemblies such that the plurality of containers are positioned adjacent to each other as they move through the plurality of work stations. A computer control system is programmable to control the coordinated operation of the conveyor assemblies so as to move such conveyor assemblies at different cycles of movement as the containers move through the work stations.

14 Claims, 8 Drawing Sheets

TRANSPORT SYSTEM FOR MOVING A PLURALITY OF CONTAINERS THROUGH A PLURALITY OF WORK STATIONS

BACKGROUND OF THE INVENTION

The present invention relates generally to a transport system for moving a plurality of containers through a plurality of work stations and, more particularly, to a transport system having at least two conveyor assemblies, each conveyor assembly being adaptable to sequentially convey at least one group of containers therealong in a row from one work station to another work station, each conveyor assembly being driven independent of the other, and both conveyor assemblies conveying the respective groups of containers on a same conveying path adjacent to each other as they move through the plurality of work stations.

Mega quantities of tablets are filled and distributed by pharmaceutical and nutraceutical manufacturers. Packaging systems for tablet containers are not new and typically include a container loading station, a tablet filling station, a cotton insertion station, a capping station and a conveyor assembly which transports the tablet containers to each station. Often times, some or all of these process steps are completed separately or in groups and the containers are moved from one processing location to another in order to complete the entire packaging process. Automatic or semi-automatic packaging systems are often employed by the pharmaceutical manufacturers to save labor and to expedite the packaging process. In the known automatic or semi-automatic packaging systems for tablet containers, the conveyor assembly typically moves at the same speed throughout the entire packaging process. This means that the timing sequence for moving containers from one work station to another is controlled by the longest time cycle associated with one of the work stations in the system regardless of the shorter time cycles associated with other work stations. This is inefficient and time consuming because some work stations have different timing requirements and cycles of movement as compared to other work stations.

For example, at some work stations such as the bottle loading station and the cotton insertion station, the containers are incrementally moved one container at a time to complete those particular operations whereas at other work stations such as at the tablet filling station and the capping station, the containers can remain stationery while all containers are being operated on at the same time. Operations at the respective stations therefore have different cycles of movement. Also, some packaging systems which perform the filling and capping function and which attempt to accommodate for the different cycles of operation include conveyor systems having complicated configurations. Operational features attractive to pharmaceutical companies are fast packaging process times and simple configuration of the packaging lines.

Various types of packaging systems have been disclosed in the prior art. U.S. Pat. No. 7,401,446 which issued to Perazzo et al discloses a belt wheel capping system which includes a conveyor having opposed parallel gripper belts for ushering containers single-file to a capping station for screw-capping operations, the spacing of the gripper belts being adjustable to accommodate containers of various sizes. A conveyor having a horizontal belt is flanked by opposed parallel guide rails. The containers sit on top of the belt and the belt ushers them single-file in a continuous supply to the capping station for engagement and screw-capping by a capping head. The conveyor guide rails are adjustable to accommodate containers of various sizes.

U.S. Patent Publication No. 2007/0000570 filed by Lechner et al discloses a beverage bottling plant packaging mechanism which includes a package separating device which includes a pair of guide tracks and a pair of conveyor chains. Separator fingers are positionable on projections associated with the respective guide tracks for pushing and guiding products positioned therebetween. The spacing between the fingers is selectively adjustable, both in the vertical and horizontal direction. The conveyor chains are advantageously each driven by their own motors respectively so that one conveyor chain can be moved relative to the other conveyor chain.

U.S. Patent Publication No. US 2008/0060322 filed by Schateikis et al discloses a distribution device which uses a plurality of delivery clock pulses to separate and move a plurality of objects between a first receiving device and a second receiving device. A transfer device is able to move objects from a supplying device to a first receiving device and to a second receiving device as the objects move along a conveyor system. The objects are delivered to the supplying device per clock pulses in defined groups and the objects are thus available for delivery to the receiving devices. Each group of objects can be programmed pursuant to a plurality of clock pulses to segregate and divide objects associated with each group to two different receiving devices.

The above described art, however, fails to provide an automated and compact system, operating at a mass production level of manufacture, which is capable of providing a fast packaging process with the capability of utilizing all the stations seamlessly, and at different cycles of movement at different work stations.

In an effort to overcome a variety of shortcomings in conventional packaging systems, such as the use of a large scale packaging system, complicated conveyor lines, and a slow rate of movement through the entire packaging process, the present invention provides two sets of independent belt systems wherein each belt system sequentially moves groups of containers from one station to another station on the same conveying path such that each station is used or occupied alternately by both belt systems, which system substantially expedites the packaging process, reduces the space occupied by the system, simplifies the conveyor line, is cost effective, and improves the overall efficiency of the packaging operation.

It is therefore desirable to develop a compact transport system capable of changing the speed of transportation of the containers at different work stations for different processing times and different cycles of movement associated with the different work stations.

Specific advantages and features of the present invention will be apparent from the accompanying drawings and description of several illustrative embodiments of the present invention.

SUMMARY OF THE INVENTION

The present invention relates to various embodiments of a transport system for moving a plurality of containers through a plurality of work stations and, more particularly, for filling and capping tablet containers. The present invention overcomes many of the shortcomings and limitations of the prior art transport systems discussed above, and teaches the construction and operation of several embodiments of a transport system employed for filling and capping tablet containers, and for use in a wide variety of other applications.

In one aspect of the present invention, the present transport system is part of a primary packaging system operable to transport discrete arrays of tablet containers from one packaging station to another packaging station associated with the primary packaging system. In one application, the packaging system fills and caps tablet containers carried by the transport system. The packaging system for filling and capping tablet containers generally includes a plurality of work stations such as a container loading station, a tablet filling station, a cotton insertion station, a capping station, a container unloading station, and a transport system which transports the tablet containers to each work station. In some cases, the packaging system may also include a rejection station as well as other work stations. The container loading station is provided for feeding a plurality of empty containers for engagement with the transport system and the container unloading station is provided for removing filled, capped containers from the system. The tablet filling station includes at least one tablet filler device for filing each container carried by the transport system with a single type of tablet. If the tablet filling station includes more than one filler device, the tablet containers of the same number would be filled at the same time. The cotton insertion station located downstream from the tablet filling station is provided for placing a measured length of cotton, rayon or polyester into each tablet container after the containers have been filled with tablets. The capping station located downstream from the cotton insertion station includes at least one automated cap feeder device for applying a secured cap to each tablet container after it has been filled. If a rejection station is included in the packaging system, it will typically be located between the capping station and the unloading station and will function to detect improperly filled containers, improperly capped containers, and improper cotton insertion and such station will remove such containers from the transport system prior to the unloading station. In all of these processing steps, the present transport system moves the containers from station to station in a continuous flow on the same conveying path until the packaging process is completed.

In another aspect of the present invention, the present transport system includes two sets of independent conveyor belt systems wherein each conveyor belt system sequentially moves groups of containers from one work station to another work station such that each station is utilized or occupied alternately by containers associated with both conveyor belt systems. Both conveyor belt systems are operable to move the tablet containers through various work stations with the tablet containers moving in a continuous line throughout the entire system. Movement of the containers associated with each respective conveyor belt system may have different cycles of movement depending upon the respective operations at each work station. For example, one conveyor belt system controls operations that run continuously on one container at a time, for example, operations at the loading station and at the cotton insertion station while the other conveyor belt system controls operations that have a longer cycle and are performed on a set of containers at the same time, for example, operations at the filling station and the capping station. In a preferred embodiment, each work station is operable with both conveyor belt systems in an alternating manner and a computer control system having a central computer and associated controllers includes sufficient software to be programmable to control coordinated operation of the transport system and all of the operation stations associated with the packaging system so as to alternately move both conveyor belt systems sequentially such that a plurality of tablet containers move continuously through each work station. In other embodiments of the present transport system, there is a fourth operation station which is a container labeler station which includes means to apply predetermined indicia to the containers passing therethrough, for example, attaching printed labels which are adhered to the containers, or printing indicia directly onto the containers, or both.

The present transport system may include a plurality of four moveable conveyor belts which are positioned in a vertical arrangement. The top two conveyor belts will control the movement of a plurality of staggered or spaced apart container groupings and the lower two conveyor belts will control the movement of a similar plurality of spaced apart or staggered container groupings as all of the containers move through the packaging system. The four conveyor belts are vertically aligned and each pair of conveyor belts includes means for holding and/or attaching assemblies for holding the respective containers for movement through the various work stations. The holder assemblies hold and retain the tablet containers and each includes a pair of vertical holding elements and front and rear bottle holder members. The holder assemblies are adapted to hold a plurality of empty tablet containers released at the container loading station and to convey the tablet containers in a single row along the same conveying path as each set of conveyor belts move through the system. In one embodiment, each pair of conveyor belts includes a plurality of tabs extending outwardly therefrom at predetermined locations from one another therealong, the tabs associated with the top pair of conveyor belts being staggered throughout its length from the tabs associated with the bottom pair of conveyor belts. These tabs are used to engage a slot or other means associated with each of the vertical holding elements and attach the holder elements to the respective conveyor belts. It takes two vertical holder elements to form one holding mechanism for holding a particular container therebetween, one holding element being associated with a front bottle holder member and the other holding element being associated with the rear bottle holder member. The staggered vertical holder elements and their associated front and rear holder members are driven by one of the respective pairs of conveyor belt members.

For each pair of conveyor belt members, the holding element associated with the front bottle holder member is attached to one of the belt members whereas the holding element associated with the rear bottle holder member is attached to the other belt member. In this way, each pair of belt members may be moved relative to each other to adjust the spacing between the front and rear bottle holder members so as to accommodate containers of different sizes.

Each pair of conveyor belt members, namely, the top two conveyor belt members and the bottom two conveyor belt members, are also driven separate and independent of each other and each belt member within the respective pairs can likewise be driven separate and independent from the other belt member in its associated pair. The two separate and independent pairs of conveyor belt systems can be programmed to move at different rates as will be hereinafter explained below.

In another embodiment, the means for holding and/or attaching the bottle holder assemblies to the respective conveyor belts includes a mechanism for directly attaching each individual vertical holding element to a respective belt member. In this particular embodiment, each of the respective belt members includes spaced apart openings for receiving appropriate fastening members for attaching the vertical holding elements directly to a respective belt member.

Once a bottle or container is captured and held by each respective bottle holder assembly, the captured container will sit between front and rear rail members and will rest upon a bottom rail member. The front and rear bottle holder members will be positioned between the front and rear rail members and will hold the bottle or container therebetween. The sequence of operation of the present transport system is such that containers held by the bottle holding mechanisms associated with one pair of belt members are positioned adjacent to containers held by the bottle holding mechanisms associated with the other pair of belt members as they move through the packaging system. The respective pairs of belt members are controlled by a computer which is programmed to accomplish the different incremental movements of the containers associated with the two respective pairs of belt members. For example, the pair of top belt members will control movement of the containers that are located at the filling station, the capping station, and the unloading station whereas the pair of bottom belt members will control movement of the containers at the bottle loading station, the cotton insertion station and bottle exiting station.

The various work stations will overhang and cantilever over the various belt members and one set of containers, such as at the loading station, will be controlled by one set of belt members whereas the adjacent set of containers sitting at the next station will be controlled by the other set of belt members. During a particular operation, all of the containers associated with one set of belt members will stay stationary while all containers associated with that particular set of belt members are being operated on at the same time whereas the containers associated with the other set of belt members will be incrementally moved one bottle at a time to complete those particular operations. Once the containers associated with the set of belt members which move incrementally one bottle at a time have completed their single bottle operation, both sets of belt members will move their respective containers to the next work station. At this point, control of the respective pairs of belt systems will reverse such that the top pair of belt members will now move one container at a time whereas the container associated with the bottom pair of belt members will not move individually but will stay stationary while all containers are being operated on at the same time. In this regard, operations that are performed on all containers at a time, such as at the filling station and the capping station, are alternated with operations that have a different cycle time and run continuously on one container at a time, such as at the loading station and cotton insertion station.

The present transport system therefore provides for an improved packaging process; it provides for substantial reduction and simplification of the conveyor lines; and it provides for seamless use of the respective work stations. Specific advantages and features of the present system will be apparent from the accompanying drawings and the description of several illustrative embodiments of the present invention.

BRIEF DESCRIPTION OF DRAWINGS

For a better understanding of the present invention, reference may be made to the accompanying drawings.

It should be understood that the drawings are not necessarily to scale and that the embodiments disclosed herein are sometimes illustrated by fragmentary views. In certain instances, details which are not necessary for an understanding of the present invention or which render other details difficult to perceive may have been omitted. It should also be understood that the invention is not necessarily limited to the particular embodiments illustrated herein. Like numbers utilized throughout the various figures designate like or similar parts or structure.

DETAILED DESCRIPTION OF THE INVENTION

Figure 1:
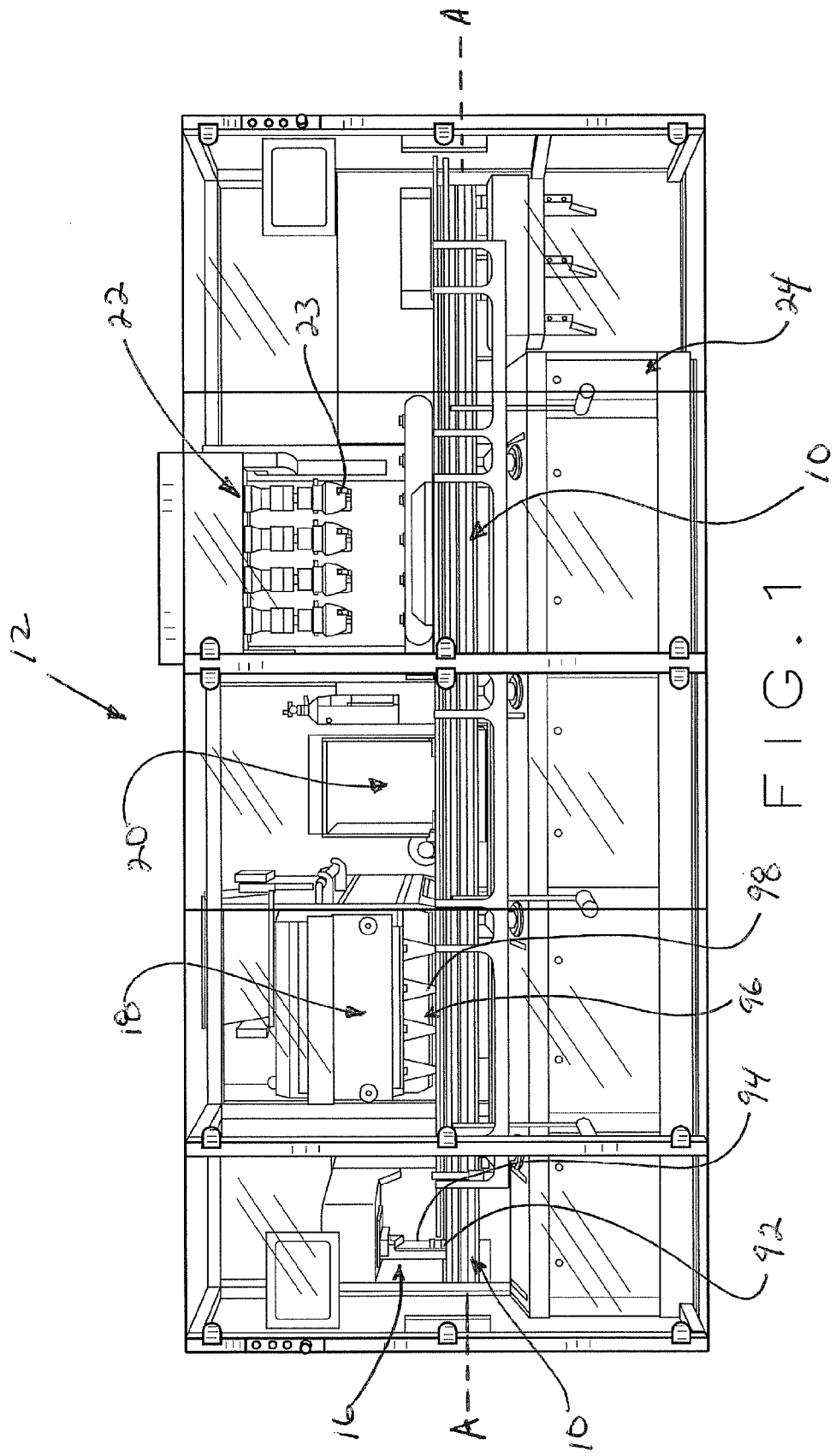
FIG. 1 is a front elevational view of a packaging assembly constructed in accordance with the teachings of the present invention showing some, but not all, of the work stations illustrated in FIG. 1.
Figure 2:
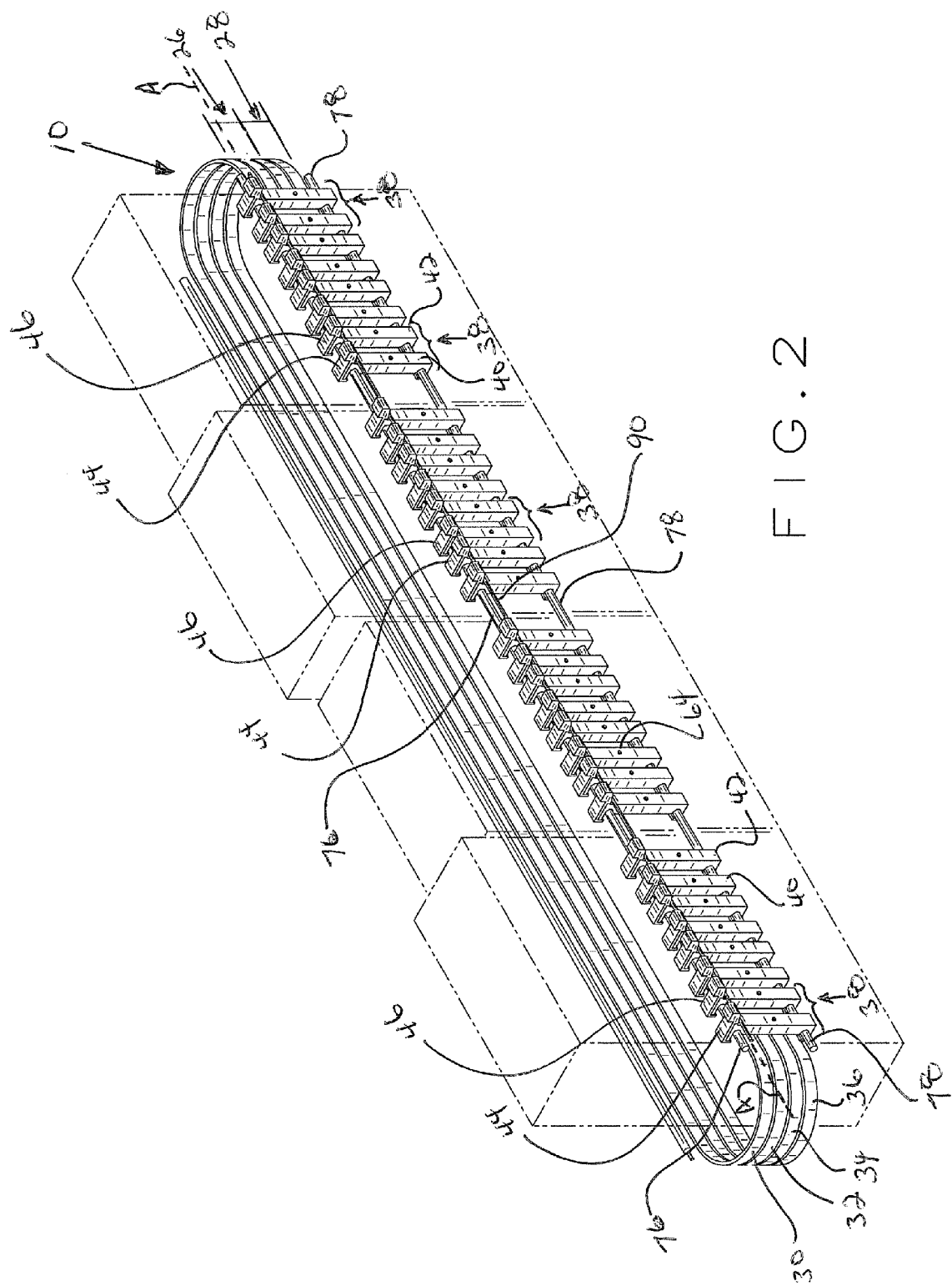
FIG. 2 is a perspective view of one embodiment of the present transport system constructed in accordance with the teachings of the present invention showing some, but not all, of the work stations illustrated in FIG. 1.

FIG. 1 illustrates a partially sectioned front elevational view, with some parts removed for clarity, of one embodiment of the present packaging assembly including the present transport system for moving containers from one work station to another. Referring to the drawings more particularly by reference numbers, the numeral 10 in FIGS. 1 and 2 identifies one embodiment of a transport system for use with the packaging assembly 12 for filling tablets and capping tablet containers constructed in accordance with the teachings of the present invention. The transport system 10 can be manufactured so as to be compatible for attachment to any suitable type of packaging assembly 12 for filling and capping tablet containers or for performing other operations on other appropriate products. The packaging assembly 12 includes a plurality of work stations, such as a container loading station 16, a tablet filling station 18, a cotton insertion station 20, a capping station 22, a container unloading station (not shown), and the transport system 10 which transports the tablet containers to each work station as best illustrated in FIGS. 1 and 2. The work stations 16, 18, 20, 22 are coupled together, integrated and arranged consecutively in relation to an advancing conveying path A traveled by the tablet containers to be filled, according to a particular configuration, as will be hereinafter disclosed in detail below. All the work stations 16, 18, 20, 22 and the transport system 10 are mounted and arranged on a single platform 24 dimensioned in such a way as to convey the tablet containers through each work station on a single conveying path so as to be compatible with movement of the tablet containers through the entire packaging system. The transport system 10 conveys the tablet containers through the respective work stations 16, 18, 20, 22 in a generally straight line which is preferably generally parallel to conveying path A as illustrated in FIGS. 1 and 2. The platform 24 is adapted for supporting the various components of the work stations 16, 18, 20, 22 and the transport system 10. All of the work stations 16, 18, 20, 22 and the transport system 10 are managed and controlled by a computer control system which is programmable to control the movement of the tablet containers through the various work stations.

Figure 3:
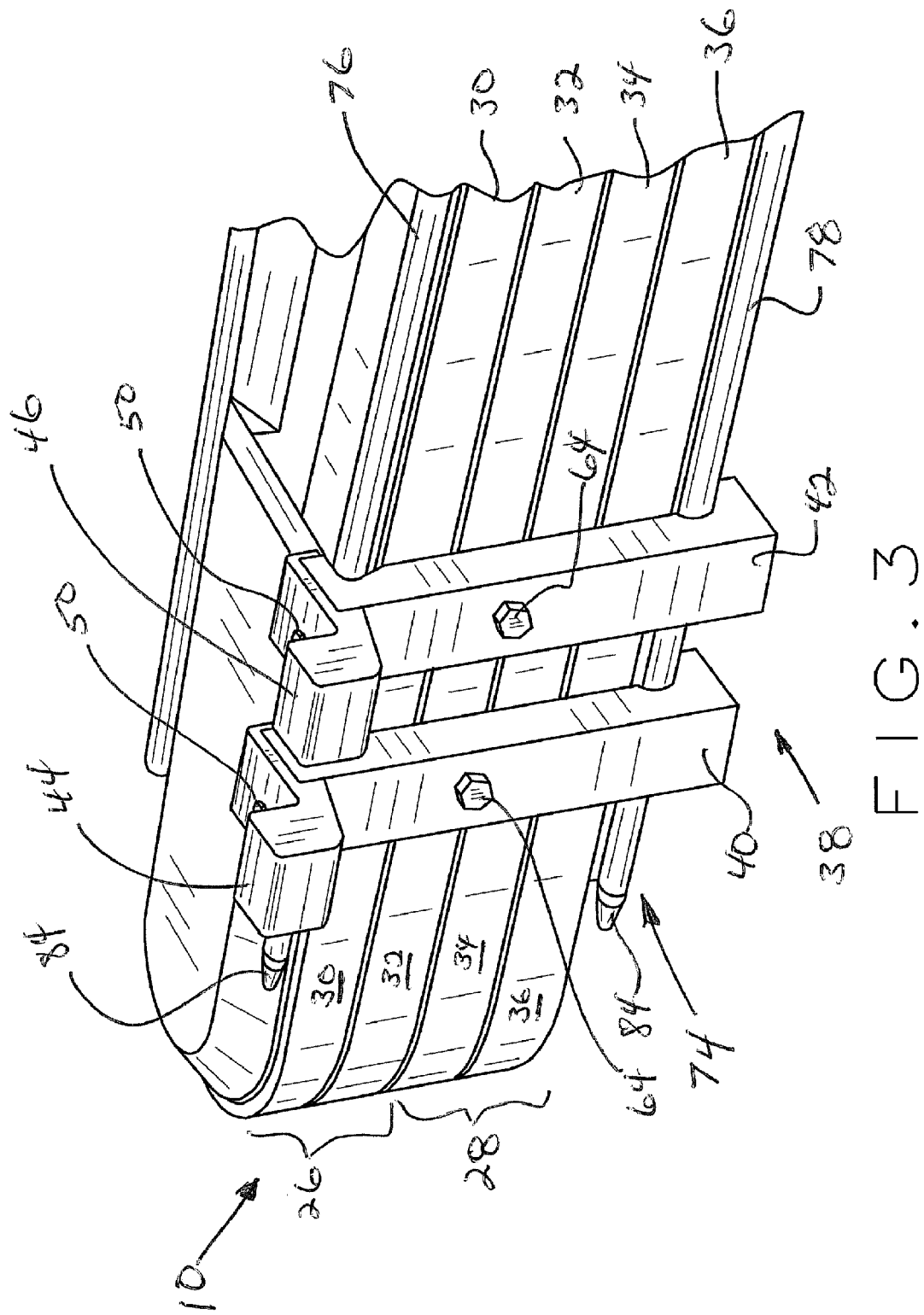
FIG. 3 is a partial perspective view of the transport system of FIG. 2 illustrating a bottle holder assembly constructed in accordance with the teachings of the present invention.

FIGS. 1-3 illustrate the present transportation mechanism 10 for moving the tablet containers (not shown) through the packaging system 12. In one embodiment, the present transport system 10 includes two sets of independent conveyor belt systems, a first conveyor belt system 26 and a second conveyor belt system 28, for receipt of and transfer of the tablet containers through the system 12 as they are fed from the container loading station 16. As will be hereinafter explained in applications where the bottle holder mechanism can be manually or otherwise adjusted, or can be preset to receive a certain tablet container size without the use of two belt members in each conveyor system, the belt systems 26 and 28 may each include only one belt member. The system further includes a computer control system having a central computer and associated controllers (not illustrated) having at least one controller connected to each of the conveyor belt systems 26 and 28 and to the work stations 16, 18, 20 and 22, the central computer having sufficient software to be programmable and adapted to control coordinated operation of the transport system 10 and all of the work stations so as to move both conveyor belt systems 26, 28 with their associated tablet containers coupled thereto as will be hereinafter explained sequentially through each work station thereby filling the tablet containers with a predetermined number of tablets, inserting cotton or the like into each container, capping the containers, and subsequently moving the containers through the container unloading station.

In another embodiment, the present transport system 10 includes a plurality of four moveable conveyor belts 30, 32, 34, 36 which are positioned in a vertical arrangement as illustrated in FIGS. 2 and 3. The top two conveyor belts 30, 32 form a first conveyor belt system 26 and control the movement of a plurality of staggered or spaced apart tablet container groupings and the lower two conveyor belts 34, 36 form a second conveyor belt system 28 and control the movement of a similar plurality of spaced apart or staggered tablet container groupings. The four conveyor belts 30, 32, 34, 36 are vertically aligned and each pair of belts 30, 32, 34 and 36 move sequentially relative to each other at different cycles of movement to accommodate different processing times associated with different work stations.

Figure 4:
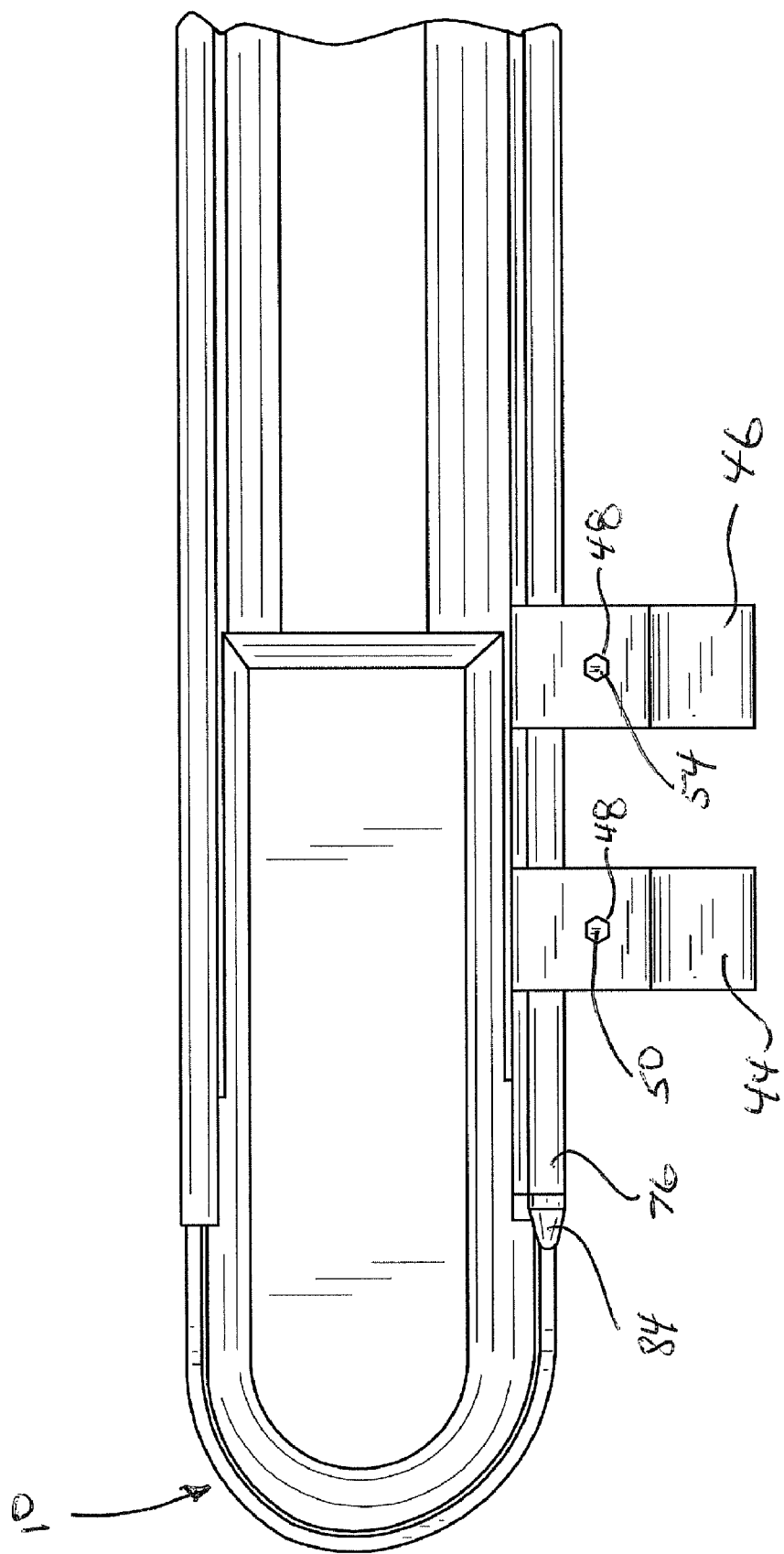
FIG. 4 is a top elevational view of the transport system of FIG. 3 showing the bottle holder assembly constructed in accordance with the teachings of the present invention.

FIGS. 2-4 illustrate the container holding mechanism as the conveyor belt systems 26, 28 move the tablet containers (not shown) through the transport system 10. Each set of the conveyor belt systems 26, 28 includes a plurality of container holder assemblies 38 which hold tablet containers, each of the holder assemblies 38 including two vertical holding elements 40, 42 and front and rear bottle holder members 44, 46. The holder assemblies 38 are adapted to receive and retain a plurality of empty tablet containers released at the container loading station 16 and to convey the tablet containers in a single row along the conveying path A which is parallel to the longitudinal axis of both conveyor belt systems 26, 28. The vertical holding elements 40, 42 are associated respectively with the front and rear bottle holder members 44, 46. It takes two vertical holder elements 40, 42 to form one holding mechanism 38 for holding a particular container between the front and rear bottle holder members 44, 46 which are located and mounted to the top portion of each respective vertical holder element 40, 42. In the embodiment illustrated in FIGS. 2-6, holding element 40 associated with the front bottle holder member 44 is attached or otherwise engaged to one of the belt members associated with either conveyor belt system 26 and 28 as will be hereinafter explained, and holding element 42 associated with the rear bottle holder member 46 is attached or otherwise engaged to the other belt member associated with the respective conveyor belt systems 26 and 28. This means that one or both belt members 30 and 32 can be moved relative to each other to adjust the spacing between the front and rear bottle holder members 44 and 46 to accommodate containers of different sizes associated with conveyor belt system 26. The same is true with respect to adjusting the spacing of the front and rear bottle holder members 44 and 46 associated with belt members 34 and 36 of conveyor belt system 28. In addition, each pair of conveyor belts 30, 32, 34, 36, namely, the top two conveyor belts 30, 32 and the bottom two conveyor belts 34, 36, are also driven separate and independent of each other. The two separate and independent pairs of conveyor belt systems 26, 28 can be programmed to move at different rates as explained below.

Figure 5:
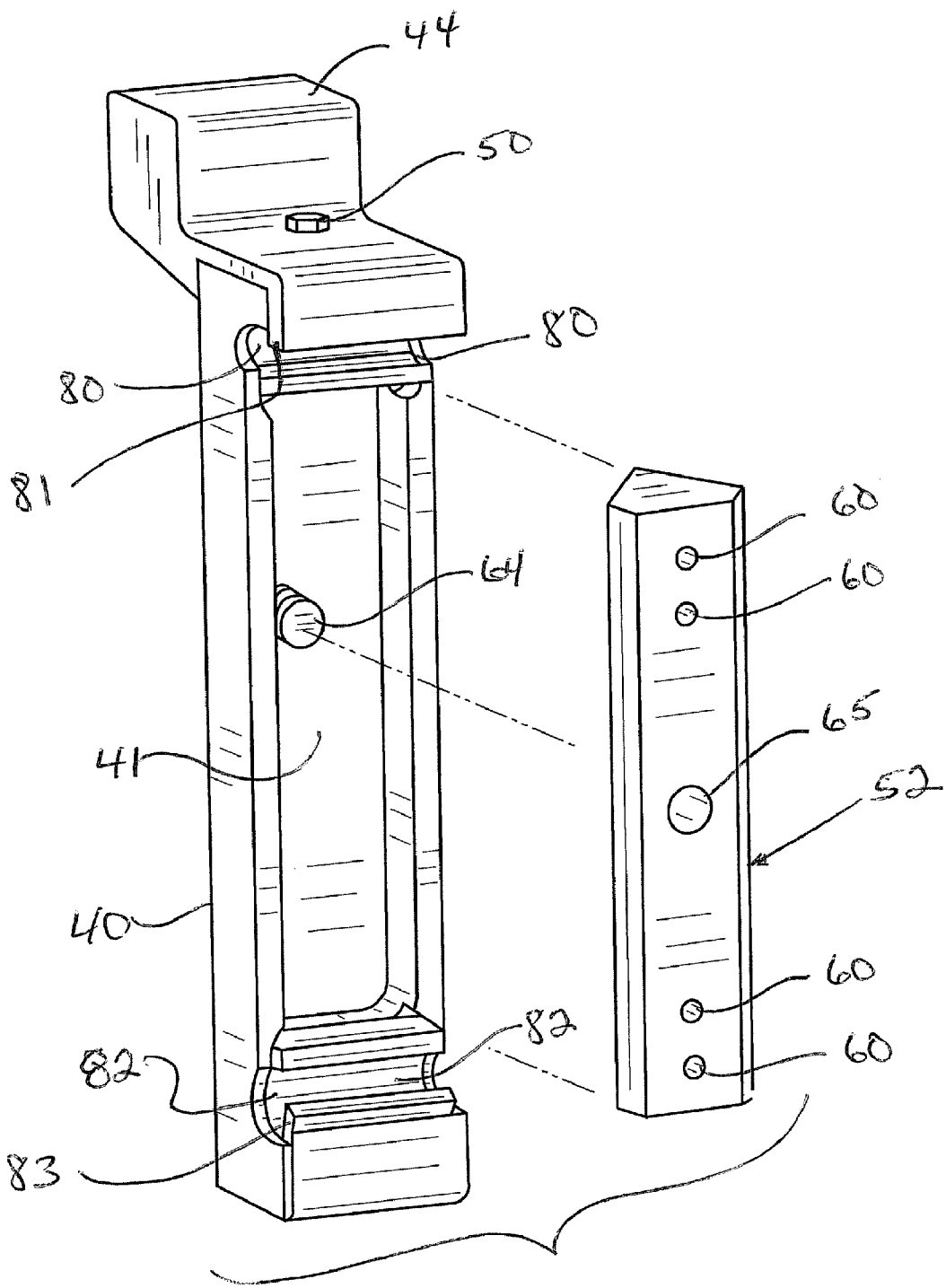
FIG. 5 is an exploded perspective view of one of the bottle holder members of FIG. 3 showing the inside side portion of the holder element.

The two bottle holder members 44, 46 are mounted on or otherwise attached to the two elongated vertical holder elements 40, 42 forming a single holder assembly 38 via attachment means best illustrated in FIGS. 3-5. The attachment means includes a fastening hole 48 extending through each holder member 44, 46 for receiving a screw or other fastening member 50 which is inserted through the opening 48 and advanced into a threaded socket (not shown) formed on the top portion of the holder elements 40, 42. The fastener 50 attaches the bottle holder members 44, 46 to holder elements 40, 42. The space between the front and rear holder members 44, 46 can be adjusted as previously explained to fit different tablet container sizes by adjusting the respective pairs of conveyor belts relative to each other as previously explained.

The holder elements 40, 42 are affixed to the outer surface of the respective conveyor belts 30, 32, 34, 36. In one embodiment, the holder elements 40, 42 include attaching means such as a bolt and nut combination to secure the holder elements to the conveyor belt systems 26, 28. As illustrated in FIGS. 2-6, each holder element 40, 42 is provided at the rear surface thereof with a vertical fastening member 52 extending from the top conveyor belt 30 to the bottom conveyor belt 36. The fastening member 52 is positioned within a cavity 41 formed within the respective holder elements 40, 42 as illustrated in FIG. 5 and the fastening member 52 is positioned between the holder elements and the conveyor belts 30, 32, 34, 36. Each respective holder element 40, 42 is further provided with two plugs 54, a socket member 56, and a pair of nuts or other suitable fastening members 58 for attaching the fastening member 52 to one of the conveyor belts 30, 32, 34, 36. This attachment arrangement is illustrated in FIG. 6A.

Figure 6A:
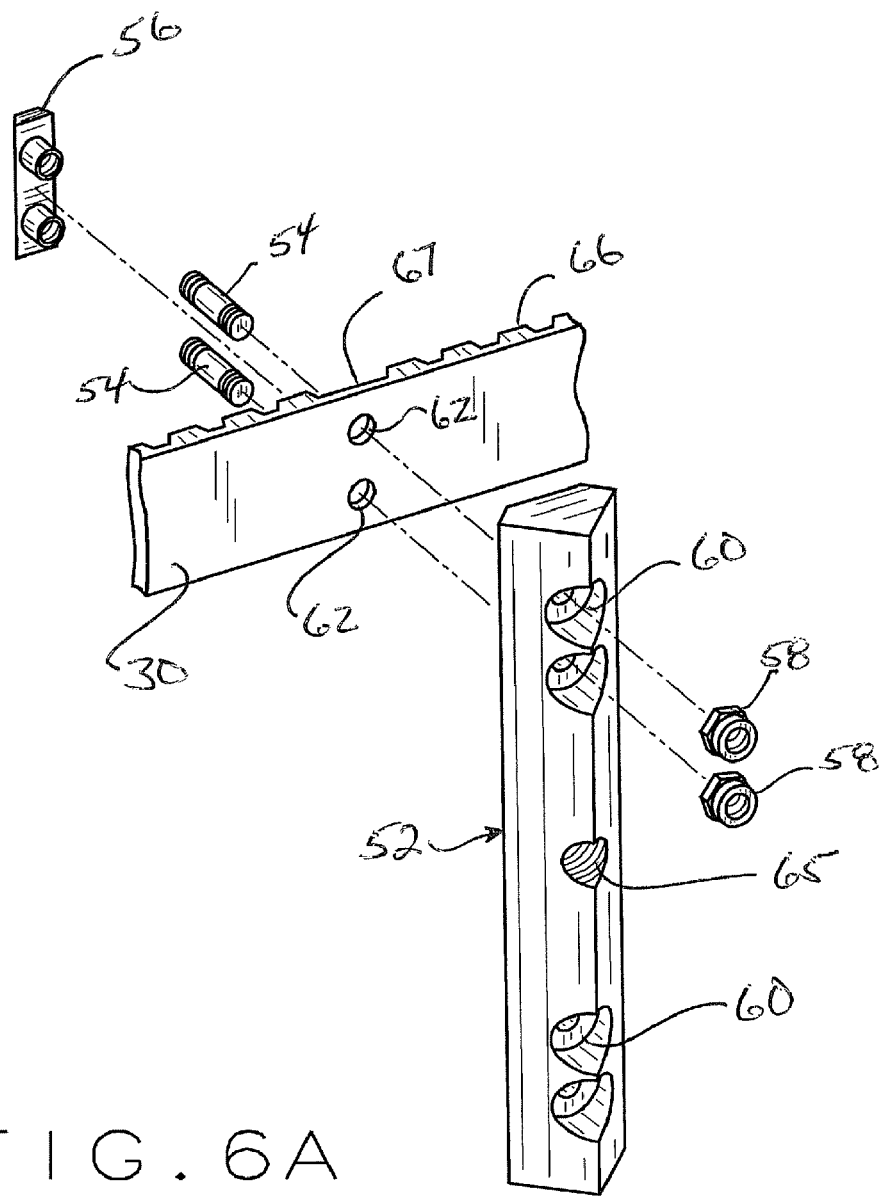
FIG. 6A is an exploded perspective view of the fastening member of FIG. 5 showing attachment of the fastening member to a conveyor belt.
Figure 6B:
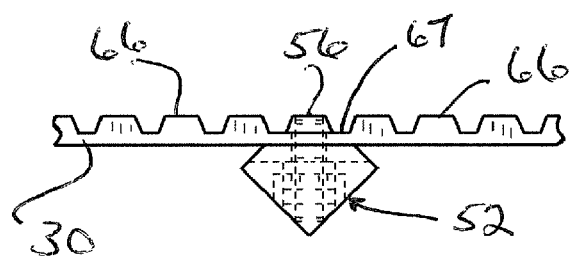
FIG. 6B is a top elevational view of the fastening member of FIG. 6 shown attached to a conveyor belt.

Referring to FIG. 6A, a pair of openings 60 are formed through the fastening member 52 at opposite end portions thereof, the strategic position of the openings 50 being selected depending upon the position of the conveyor belt to be attached. The top pair of openings 60 are positioned to engage one of the belt members 30, 32 associated with conveyor belt system 26 and the bottom part of openings 60 are positioned to engage one of the belt members 34, 36 associated with conveyor belt system 28. In this regard, if fastening member 52 is to be engaged with conveyor belt system 26, the top pair of openings 60 will be used and if the fastening member 52 is to be engaged with conveyor system 28, the bottom pair of openings 60 will be used. Each plug 54 as shown in FIG. 6A can be inserted through an opening 60 formed on the fastening member 52 and can be further advanced through one of the plug receiving apertures 62 formed through the conveyor belt until the opposite threaded end portions of the plug 54 are exposed. At this time, one of the corresponding mating sockets associated with socket member 56 is engaged with one end portion of the plug 54 and one of the fastening members 58 is engaged with the opposite end portions of the plug 54. This securely attaches the fastening member 52 to the conveyor belt as illustrated in FIG. 6B.

Each holding element 40, 42 is further provided with attaching means whereby the fastening member 52 is securely joined to each respective holder element 40, 42. In this regard, a threaded opening 65 is formed through the fastening member 52 at an intermediate location therealong and a corresponding threaded screw 64, as shown in FIG. 5, can be inserted and threaded through the threaded opening 65 thereby attaching the fastening member 52 to the respective holder element 40, 42. The conveyor belts 30, 32, 34, 36 are positioned between the socket member 56 and the fastening member 52. The surface of the conveyor belt facing the socket member 56 includes thereon teeth-like protrusions 66 as illustrated in FIGS. 6A and 6B for engaging a corresponding sprocket mechanism for moving the respective belt members. The surface of the conveyor belt includes a missing tooth space 67 where the plug receiving apertures 62 are formed. The socket member 56 is engaged in the missing tooth space 67 and is shaped so as to form another tooth-like protrusion 66 when the socket member 56 is attached to the conveyor belt as best shown in FIG. 6B. The fastening member 52 is securely joined to the respective holder elements 40, 42 by simply tightening the fastening member 58.

Figure 7:
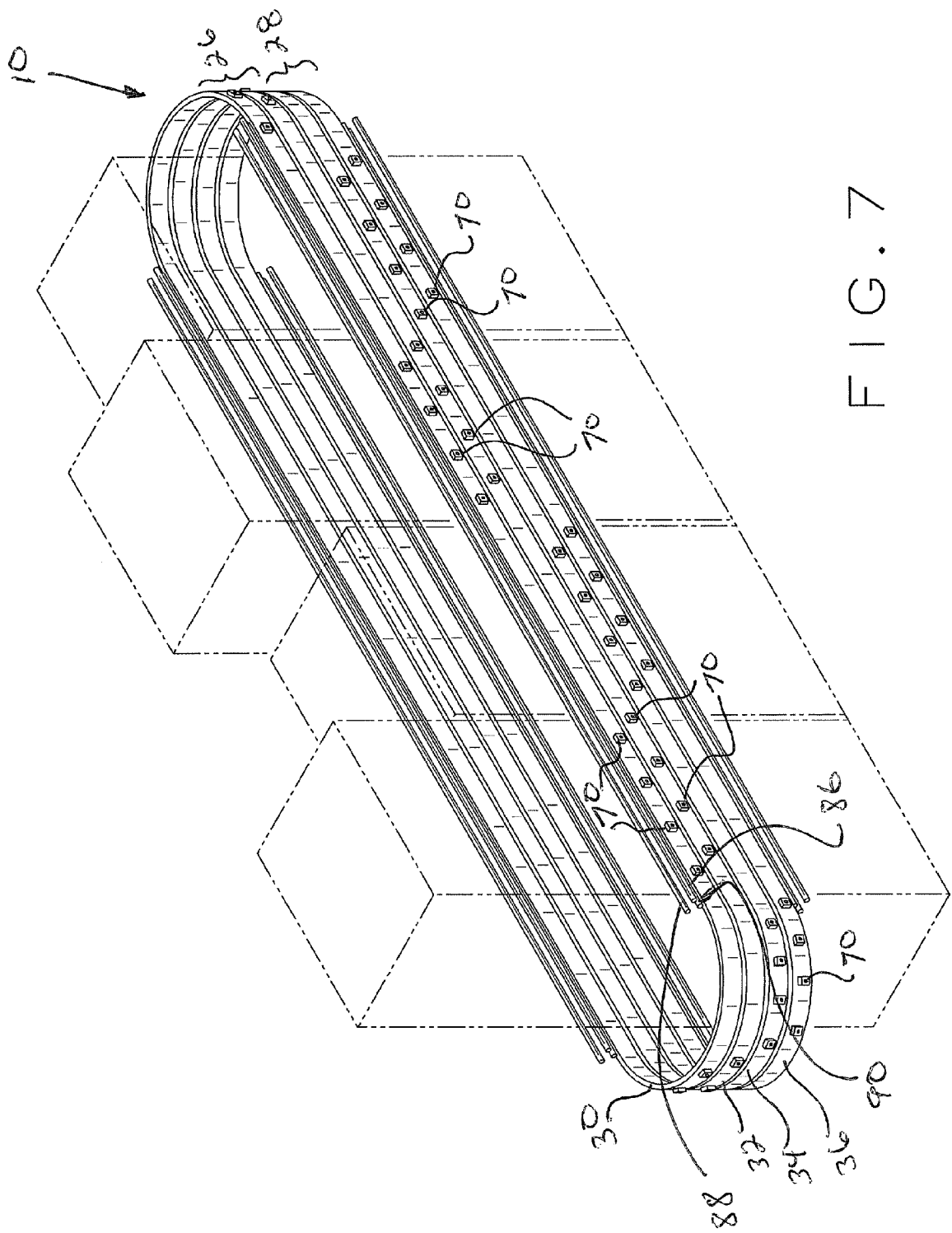
FIG. 7 is a perspective view of another embodiment of the present transport system constructed in accordance with the teachings of the present invention, the transport system being shown without holder assemblies and being shown in conjunction with some, but not all, of the work stations illustrated in FIG. 1.

FIG. 7 illustrates another embodiment of the present transport system 10 wherein each conveyor belt system 26, 28 includes a plurality of tabs 70 in the form of ears or lugs projecting outwardly therefrom, each tab 70 having a shoulder (not shown) or other means for engaging a respective holder element 40, 42. In this embodiment, the present transport system 10 includes a plurality of tabs 70 extending outwardly from the top two conveyor belts 30, 32 at predetermined locations along the length of conveyor belt system 26 as shown in FIG. 7, each pair of tabs 70 being alternately attached one to belt member 30 and the other to belt member 32. As previously explained with respect to the holder elements illustrated in FIGS. 2-6, the front holder member 44 is attached to one of the holder elements 40, 42 in each respective pair of holder elements and the rear holder member 46 is attached to the other holder element 40, 42 in each respective pair of holder elements. Similarly, since one holder element in each pair associated with conveyor belt system 26 is attached to belt member 30 and the other holder element in each pair is attached to belt member 32, one or both belt members can be moved relative to each other to adjust the spacing between the front and rear holder members 44 and 46 to accommodate different container sizes.

Similar tabs 70 are formed with the bottom two conveyor belts 34, 36 and these tabs 70 are likewise positioned at predetermined locations along the length of conveyor belt system 28. These tabs are likewise used to engage a slot (not shown) or other means associated with each of the holder elements for attaching a holder element to each tab 70 as explained above with respect to conveyor system 26. Like conveyor system 26, the holder elements and their associated front and rear holder members are attached to belt members 34 and 36 and the belt members 34 and 36 can likewise be moved relative to each other to adjust the spacing between the front and rear holder members as previously explained. Other attaching means for attaching the holder elements to the conveyor belt system 26, 28 are envisioned and can be provided if so desired. Such attaching means will be apparent to those skilled in the art. As best shown in FIG. 7, the tabs 70 are likewise alternated in groups between conveyor belt systems 26 and 28.

A stabilizing rail assembly 74 including two stabilizing rails 76, 78 disposed in the container flow path direction is also provided to support the holder assemblies 38 as illustrated in FIGS. 2-4. One stabilizing rail 76 positioned at the top of the conveyor belt systems 26, 28 and the other stabilizing rail 78 positioned at the bottom of the conveyor belt systems 26, 28 extend from the first work station to the last work station in a parallel relationship with the conveyor belt systems 26, 28. The interior surface of each holder element 40, 42 includes top and bottom grooves 80, 82 as best shown in FIG. 5. Each stabilizing rail 76, 78 is engaged with a respective groove 80, 82 associated with each holder element 40, 42 for sliding movement of the holder elements therealong. In one embodiment, a bullet nose 84 is provided at one end of the stabilizing rails 76 and 78 for facilitating sliding engagement of the holder elements 40, 42 therewith. Each groove 80, 82 is also associated with a respective flange portion 81, 82 which serves as a stop member for retaining and holding the rails 76 and 78 within their respective grooves 80 and 82 as the holder elements 40, 42 move therealong. The flange portions 81 and 83 can be formed as part of the holding element or flange portion 81 can be associated with the structure of the front and rear holder members 44, 46.

The transport system 10 further includes a set of guide rails for guiding the tablet containers as they move through the work stations which include a front rail member 86, a rear rail member 88, and a bottom rail member 90 as best shown in FIG. 7. The tablet containers will sit between the front and rear rail members 86, 88 and will rest upon the bottom rail member 90. The front and rear bottle holder members 44, 46 will be positioned between the front and rear rail members 86, 88 and will physically hold the tablet containers therebetween. Each conveyor belt system 26, 28 sequentially moves groups of the tablet containers from one work station to another work station such that each work station is occupied alternately by containers associated with conveyor belt systems 26, 28. In other words, containers associated with one conveyor belt system at one work station will be positioned adjacent to containers associated with the other conveyor belt system at an adjacent work station as they move along the same conveying path through the plurality of work stations. Movement of the tablet containers associated with each conveyor belt system 26, 28 may also have different cycles of movement depending upon the respective operations to be performed at each work station such as the work stations 16, 18, 20, 22.

The container loading station 16 is best seen in FIG. 1 and is of conventional design. The container loading station 16 is provided for feeding a plurality of empty tablet containers for engagement with the respective holder assemblies 38. The empty tablet containers are deposited to be supplied in an orderly manner with their inlet openings facing upwards. The container loading station 16 and the container unloading station (not shown) are positioned such that the packaging process begins at the container loading station 16 and ends at the container unloading station. The container loading station 16 includes bottle pushers 92 for depositing the empty containers in a position for engagement by the front and rear holder members 44 and 46 associated with each holder assembly 38 as the holder assemblies move one at a time through the loading station 16. The bottle pushers 92 are mounted on a transfer mechanism which is operable to move the bottle pushers 92 to a position adjacent the empty containers for engagement therewith, and through additional movement of the transfer mechanism, load the empty containers one at a time onto each holder assembly 38. After application of the empty container to a holder assembly 38, the transfer mechanism rotates the bottle pushers 92 out of engagement with the corresponding empty container thereby allowing movement of the empty containers via the present transport system 10 forward to the next work station. The transfer mechanism is then operable to move another empty container and repeat the loading process. The transfer mechanism also includes a bar 94 upon which the bottle pushers 92 are mounted. The movement of the transfer mechanism, and hence the bottle pushers 92, is accomplished through a suitable drive mechanism which is synchronized to the movement of both conveyor belt systems 26, 28. The bar 94 is mounted on a shaft which is movable via a linear motion device. Other means for moving the bottle pushers or for transferring the empty containers to the present transfer system can also be utilized. A plurality of empty containers (not shown) may be provided to allow for simultaneous application of a plurality of empty containers one at a time or in predetermined sequence.

The tablet filling station 18 is arranged downstream of the aforementioned container loading station 16 in relation to the conveying path A. The tablet filling station 18 includes one or more tablet fillers 96 positioned above the transport system 10 for providing tablets for filling the tablet containers carried by the transport system 10. Each tablet filler 96 is operable to dispense a predetermined quantity of tablets into each tablet container positioned thereunder. The tablet filler 96 can include a single dispensing unit with multiple outlets, multiple units each with a single outlet, or a combination thereof (not illustrated). Each tablet filler dispensing outlet 98 is generally downwardly directed and is connected to a source of tablets for supplying tablets to the respective outlets 98. If the tablet filling station 18 includes more than one filler outlet 98, once an equal number of tablet containers are position under the outlets 98, the containers are all filled at the same time. Other means for filling the tablet containers are well known in the art and can likewise be utilized.

The cotton insertion station 20 located downstream from the tablet filling station 18 is provided for placing a wad of cotton, rayon or polyester into the tablet container after the contents have been filled with tablets. The cotton or other material acts to keep the contents of the tablet container from shifting during shipping and handling of the container thereby avoiding product damage. Cotton is pulled through sets of rollers, cut to a pre-determined length, then fed over a cylinder while a blade descends to push the middle portion of the cotton over the cylinder. The cylinder inverts and a ram descends to insert the cotton ends-first into the tablet container.

The tablet containers then advance to the capping station 22 where they are capped and sealed. The capping station 22 is located downstream from the cotton insertion station 20 along the transport system 10 and includes an automated cap feeder for applying a secured cap to a tablet container after it has been filled. The capping station 22 may include a plurality of capping mechanisms 23 as illustrated in FIG. 1. Like the tablet filling station 18, once all of the tablet containers are positioned under the respective capping mechanisms 23, the containers are all capped at the same time. It is recognized and anticipated that other work stations may be incorporated into the packaging system 12 depending upon the particular application involved.

Figure 8:
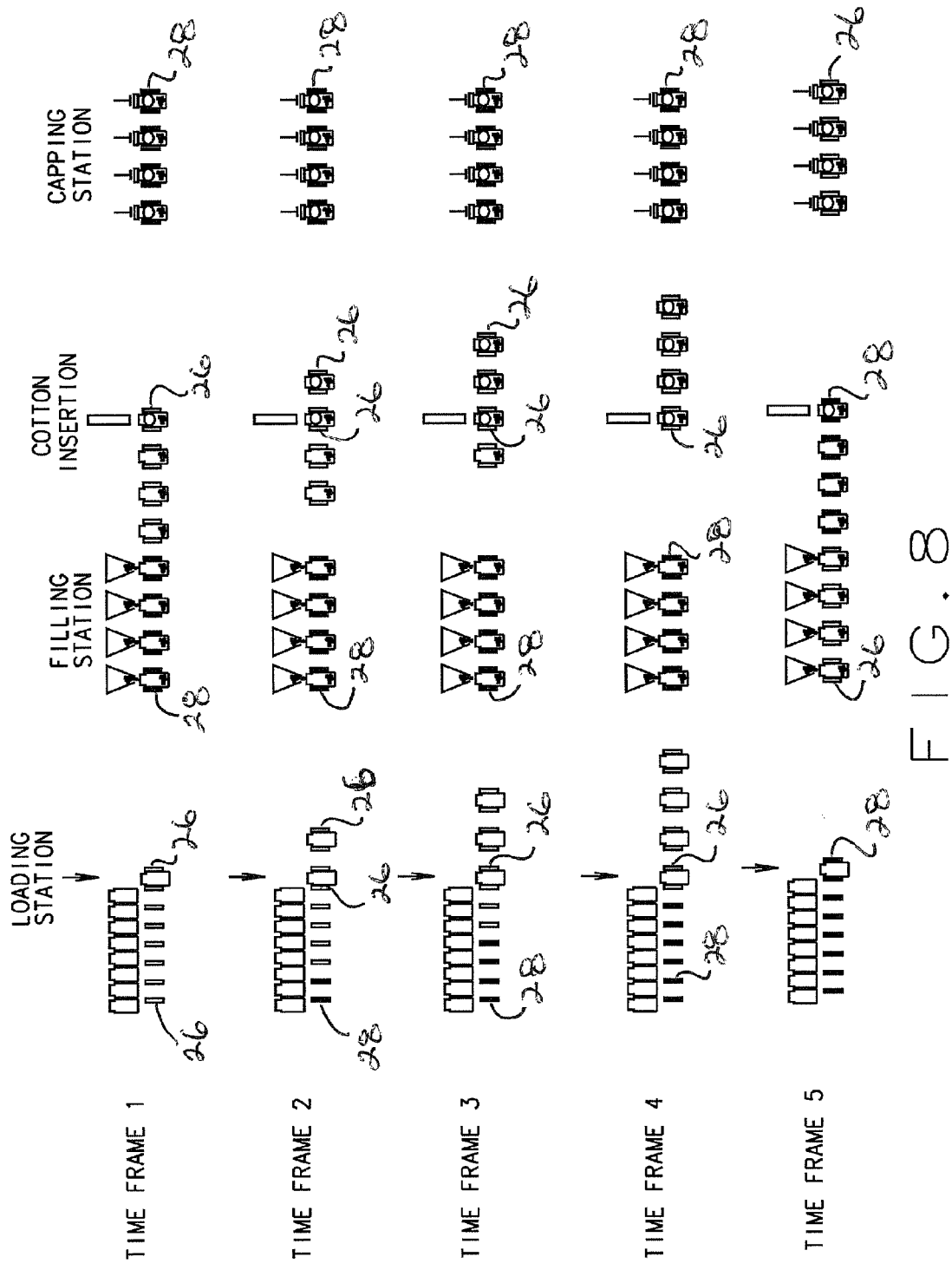
FIG. 8 is a diagram showing the sequence of operation of the present transport system constructed in accordance with the teachings of the present invention.

The sequence of operation of the present transport system 10 and movement of the containers through the various work stations is best illustrated in FIG. 8. In the sequence charts illustrated in FIG. 8, at Time Frame 1, conveyor belt system 26 controls operations that run continuously on one container at a time for the operations at the container loading station 16 and the cotton insertion station 20 whereas the other conveyor belt system 28 controls operations that have a different time cycle and where such operations are performed on a set of tablet containers at the same time, for example, the operations at the tablet filling station 18 and the capping station 22. In a preferred embodiment, each work station is operable with both conveyor belt systems 26, 28 in an alternate way. Referring to FIG. 8, the tablet containers associated with belt system 26 (belt members 30, 32 represented by the hollow bar) and belt system 28 (belt members 34, 36 represented by a solid bar) are positioned adjacent to each other as they move down the entire system. FIG. 8 illustrates the movement of the respective sets of four tablet containers associated with the first conveyor belt system 26 and the second conveyor belt system 28 as they move through the various work stations. The system is programmed to accomplish the different movements of the containers associated with the conveyor belt systems 26 and 28 as will be explained.

For example, conveyor belt system 28 will control movement of the tablet containers that are at the filling station 18 and capping station 22 whereas the conveyor belt system 26 will control movement of the first four (4) tablet containers at the container loading station 16 and at cotton insertion station 20. Loading of the first four (4) containers takes place over Time Frames 1-4. In other words, during Time Frame 1 the first container is loaded onto belt system 26, during Time Frame 2 the second container is loaded onto belt system 26, during Time Frame 3 the third container is loaded onto belt system 26, and during Time Frame 4 the fourth container is loaded onto belt system 26. Although these sequences of movement depicted in FIG. 8 illustrate a container grouping of four (4) tablet containers moving through each work station, it is recognized and anticipated that the packaging system 12 and the present transport system 10 can be configured for any grouping of containers at each of the various work stations.

As illustrated in FIG. 1, the various work stations 16, 18, 20, 22 will overhang or cantilever over the various belt members and one set or grouping of containers, such as at the loading station, will be controlled by one set of belt members whereas the adjacent set of containers sitting at the next station will be controlled by the other set of belt members and this alternating control of the various sets of containers will continue through all of the various work stations. During a particular operation (Time Frames 1-4), all of the containers associated with the conveyor belt system 28 will stay stationary while all four containers are being operated on at the same time whereas the four containers associated with conveyor belt system 26 will be incrementally moved one container at a time to complete those particular operations. Once the four containers associated with conveyor belt system 26 have completed their single container operations, both conveyor belt systems 26, 28 will move the respective tablet containers to the next work station. At this point, control of the conveyor belt systems 26, 28 will be reversed such that conveyor belt system 28 will now incrementally move one container at a time whereas conveyor belt system 26 will not move incrementally but will instead remain stationary while all four containers are being operated on at the next station. This transition occurs at Time Frame 5 in FIG. 8. In this regard, operations that run continuously on one container at a time such as loading the containers and cotton insertion are alternated with operations that have a different time cycle and are performed on all four containers at a time such as at the filling and capping stations.

Referring again to FIG. 8, while four individual tablet containers are loaded onto conveyor belt system 26, one at a time, at loading station 16 during Time Frames 1-4, four additional tablet containers carried by conveyor belt system 28 are being filled simultaneously, all at the same time, at filling station 18. This means that while four individual containers are cycled, one at a time, through loading station 16, the four tablet containers being filled simultaneously at filling station 18 remain stationary during this same time period, namely, Time Frames 1-4. Likewise, during Time Frames 1-4, four additional tablet containers carried by conveyor belt system 26 are being cycled, one at a time, through the cotton insertion station 20 and four additional tablet containers carried by conveyor belt system 28 are being simultaneously capped at capping station 22.

As previously stated, during this same time period, namely, Time Frames 1-4, the respective sets of four tablet containers carried by conveyor belt system 26 are each moved, one at a time, through their respective work stations whereas the respective sets of four tablet containers carried by conveyor belt system 28 remain stationary such that all four tablet container are worked on simultaneously. At Time Frame 5, after the first four tablet containers have been loaded onto conveyor belt system 26, a central computer (not shown) which controls the movement of the respective conveyor belt systems 26, 28, reverses the sequence of movement of the respective conveyor belt systems 26, 28 such that, starting at Time Frame 5, conveyor belt system 28 will move the next four tablet containers incrementally, one at a time, through the loading station 16 and the cotton insertion station 20 whereas the tablet containers carried by conveyor belt system 26 will now remain stationary at the filling station 18 and the capping station 22 until those operations are completed. This process is again reversed after the next set of four containers are moved through the loading station and this reversal of the sequence of movement of the conveyor belt systems 26 and 28 continues throughout the entire packaging process. This sequence of movement and reversal of the operation of the conveyor belt systems 26 and 28 allows each set of tablet containers to move through the respective work stations at the appropriate speed based upon the work station cycle time so as to sequentially complete all of the work station operations during a set period of time such as during Time Frames 1-4, and while the tablet containers move in a continuous, single product flow path.

The computer control system associated with the present transport system 10 may include a central computer and any number of associated controllers, at least one controller being connected to each of the respective belt members associated with each conveyor belt system 26 and 28, as well as with the respective work stations 16, 18, 20 and 22 so as to both move the belt members and accomplish the operational tasks associated with each work station. The computer control system will include sufficient software to be programmable and adapted to control the coordinated operation of both conveyor belt systems 26 and 28 as well as all of the operational work stations associated with any particular packaging system. The computer control system will likewise control and coordinate the movement of the respective belt members to adjust the spacing between the respective front and rear holder members 44 and 46 at the beginning of each packaging application based upon the size of the particular container to be held therebetween. This movement is likewise programmable into the computer control system, or such independent movement of the respective belt members 30, 32, 34 and/or 36 can be manually controlled by an operator. Still further, in those situations where the spacing between the front and rear holder members 44 and 46 are manually adjusted by an operator and no computer controlled system is involved, the conveyor belt systems 26 and 28 may each include just a single belt member such as just belt members 30 and 34 whose movements are again controlled as explained above via a computer control system. Other computer configurations and programmable control features are likewise recognized and anticipated for use with the present transport system 10.

Although the present transport system 10 has been disclosed and described herein with respect to the specific packaging system 12 for filling and capping tablet containers, it is recognized and anticipated that the present transport system 10 may be utilized in a wide variety of different packaging and other systems where products are moved via a conveyor system through a plurality of different work stations, and wherein at least some of the plurality of work stations have different cycle times for completing the various operations associated therewith.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present constructions will, however, become apparent to those skilled in the art after considering this specification and the accompanying drawings. All such changes, modifications, variations and other uses and applications which do not depart from the spirit and scope of the invention are deemed to be covered by the invention and the scope of the present disclosure is not intended to be limited solely to the embodiments shown herein. All structural and functional equivalents to the elements of the various embodiments described throughout this disclosure that are known or later come to be known to those of ordinary skill in the art are expressly incorporated herein by reference and are intended to be encompassed by this disclosure.

What is claimed is:

1. An apparatus for transporting a plurality of containers through a plurality of work stations comprising:

at least two conveyor assemblies, each conveyor assembly being adapted to sequentially and simultaneously convey at least one group of containers therealong in a continuous row along a same conveying path located parallel to the longitudinal axis of both conveyor assemblies from one work station to another work station, each conveyor assembly being driven independent of the other, said plurality of work stations being positioned and located along said same conveying path, said at least two conveyor assemblies being vertically arranged one on top of the other and both said conveyor assemblies conveying their respective groups of containers along said same conveying path through said plurality of work stations, each work station being used or occupied alternatively by containers associated with each conveyor assembly;

a plurality of holder assemblies for holding the containers, some of said holder assemblies being attached to one of said conveyor assemblies and some of said holder assemblies being attached to the other of said conveyor assemblies, said holder assemblies being position and located on said at least two conveyor assemblies such that said plurality of containers held by said holder assemblies are positioned adjacent to each other in a continuous line as they move through the plurality of work stations such that the containers held by one of said conveyor assemblies are positioned alternatively adjacent to containers held by the other of said at least two conveyor assemblies and such that one work station is occupied by containers associated with one of said conveyor assemblies and the next adjacent work station is occupied by containers associated with the other of said conveyor assemblies; and a controller coupled to said conveyor assemblies, said controller being operable to control coordinated movement of said conveyor assemblies so as to move the containers attached to said conveyor assemblies in sequence through the work stations along the same conveying path.

2. The apparatus of claim 1 wherein said at least two conveyor assemblies include a first conveyor assembly and a second conveyor assembly, both conveyor assemblies moving at different rates while operations are being performed on the containers at different work stations.

3. The apparatus of claim 2 wherein the first conveyor assembly incrementally moves one container at a time through a first work station while the second conveyor assembly stays stationary at a second work station.

4. The apparatus of claim 1 wherein each of said at least two conveyor assemblies includes first and second conveyor belt.

5. The apparatus of claim 1 wherein each of said holder assemblies includes first and second holder members adapted for holding a container therebetween, said first and second holder members being adjustable to accommodate containers of different sizes.

6. The apparatus of claim 1 wherein each of said at least two conveyor assemblies includes first and second conveyor belt, and wherein each of said holder assemblies includes first and second holder members adapted for holding a container therebetween, said first holder member being moved by the first conveyor belt member and the second holder member being moved by the second conveyor belt member.

7. The apparatus of claim 1 further including means for attaching said holder assemblies to said conveyor assemblies.

8. The apparatus of claim 7 wherein said means for attaching said holder assemblies to said conveyor assemblies includes a plurality of tab members associated with and spaced apart along at least a portion of the length of said conveyor assemblies, said tab members being adapted to engage said holder assemblies.

9. The apparatus of claim 7 wherein said means for attaching said holder assemblies to said conveyor assemblies includes at least one fastening member attachable to each of said holder assemblies, said fastening member being further attachable to one of said conveyor assemblies.

10. The apparatus of claim 1 further including a rail assembly for guiding the containers held by said holder assemblies as they move from one work station to another.

11. The apparatus of claim 1 further including a rail assembly engageable with said holder assemblies for stabilizing said holder assemblies as they move from one work station to another.

12. The apparatus of claim 1 wherein each of said holder assemblies includes a pair of holder elements, one holder element including a first holder member and the other holder element including a second holder member, and a fastening member attachable to each holder element and to one of said conveyor assemblies.

13. The apparatus of claim 4 wherein the respective first and second conveyor belt members associated with said at least two conveyor assemblies are all vertically arranged relative to each other.

14. The apparatus of claim 4 wherein the respective first and second conveyor belt members associated with said at least two conveyer assemblies are movable separate and independently of each other.

* * * * *